United States Patent [19]

Wolmarans

[11] Patent Number: 4,640,523
[45] Date of Patent: Feb. 3, 1987

[54] HITCH ASSEMBLY

[76] Inventor: Johann R. Wolmarans, 2 Cornelius, Glen Marais, Campton Park 16280, South Africa

[21] Appl. No.: 743,552

[22] Filed: Jun. 11, 1985

[51] Int. Cl.$^4$ .............................................. B60D 1/14
[52] U.S. Cl. ................................ 280/491 D; 280/495; 280/503
[58] Field of Search ........... 280/491 R, 491 C, 491 D, 280/493, 495, 498, 500, 501, 502, 503

[56] References Cited

U.S. PATENT DOCUMENTS

| | | | |
|---|---|---|---|
| 1,572,914 | 2/1926 | Fleming | 280/503 |
| 2,289,730 | 7/1942 | Roddel | 280/502 X |
| 2,522,793 | 9/1950 | Koeckritz | 280/503 X |
| 2,782,944 | 2/1957 | Macklin | 280/502 X |
| 3,000,652 | 9/1961 | Hawkins | 280/456 R |
| 3,072,419 | 1/1963 | Safford | 280/502 X |
| 3,083,040 | 3/1963 | Hayman et al. | 280/493 |
| 3,129,019 | 4/1964 | Bartone | 280/485 |
| 3,200,972 | 8/1965 | La Venture | 280/503 X |
| 3,583,728 | 6/1971 | Cornell | 280/503 |
| 3,834,737 | 9/1974 | Elkins | 280/502 |

FOREIGN PATENT DOCUMENTS 1526882 10/1978 United Kingdom ........... 280/491 D

Primary Examiner—John A. Pekar
Attorney, Agent, or Firm—Neil F. Markva

[57] ABSTRACT

The hitch assembly has a rigid structural configuration for attachment to a vehicle having front and rear axle frame structures. The device is used for towing one vehicle with another and may be fitted to either one of the front or rear axle frame structures. The assembly comprises a boom portion including a coupling mechanism for attaching to another hitch mechanism. The coupling mechanism may be designed for the attachment to a standard ball or may be a standard ball depending on whether the assembly is being used for a tow bar or as a ball hitch assembly. Two leg members are mounted to the boom portion and are pivotal with respect to each other. Each leg member includes a contact end for abutting an axle frame structure of a vehicle. A flexible line such as a chain extends outwardly from each of the contact ends of the leg members to wrap around the axle frame structure against which the contact end abuts. A mechanism mounted on the assembly is used to pull the line at a location laterally displaced rearwardly from the contact ends to thereby simultaneously tighten the line that is wrapped around the respective axle structure while pivotally urging the two leg members inwardly with respect to each other.

20 Claims, 9 Drawing Figures

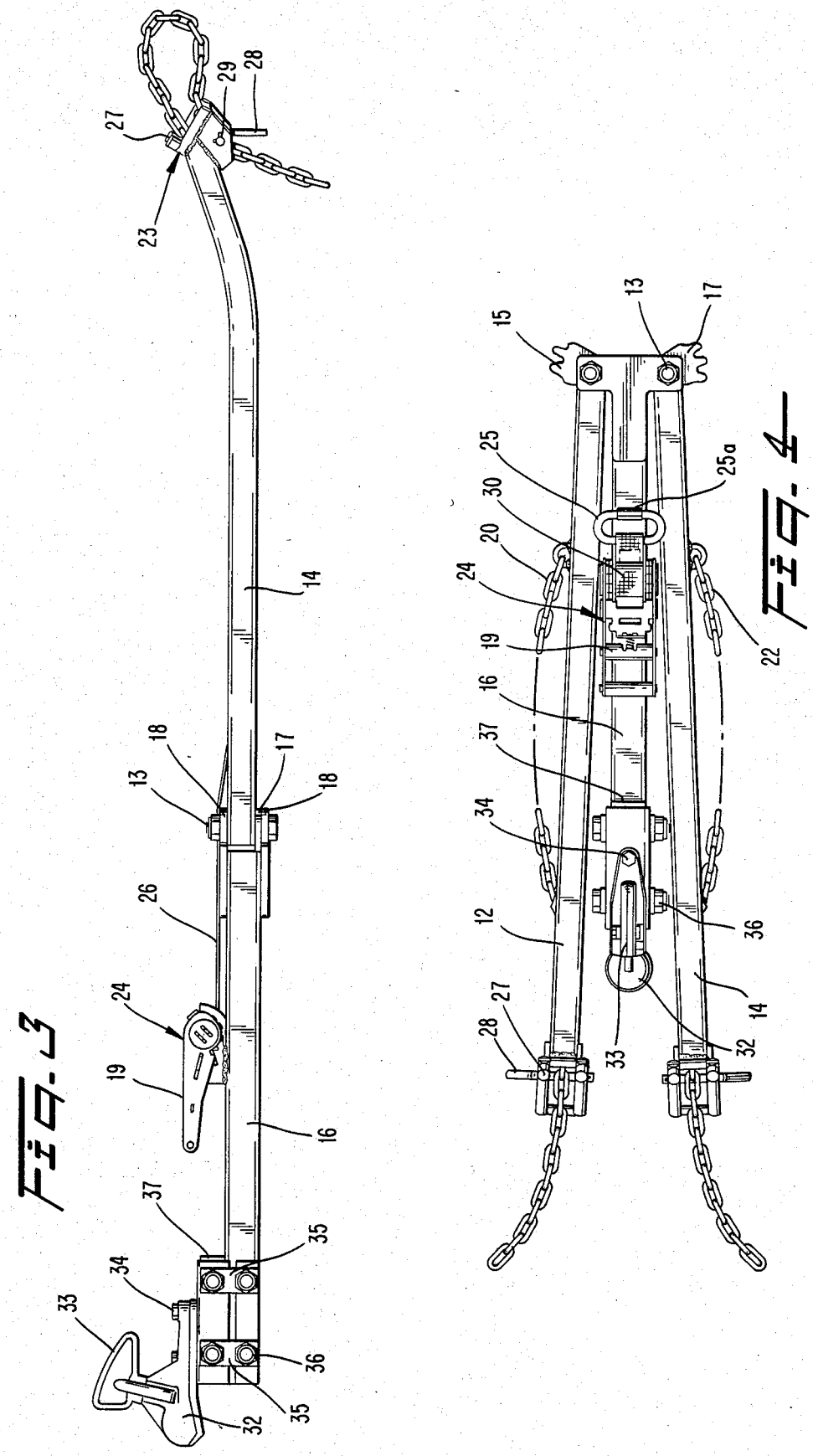

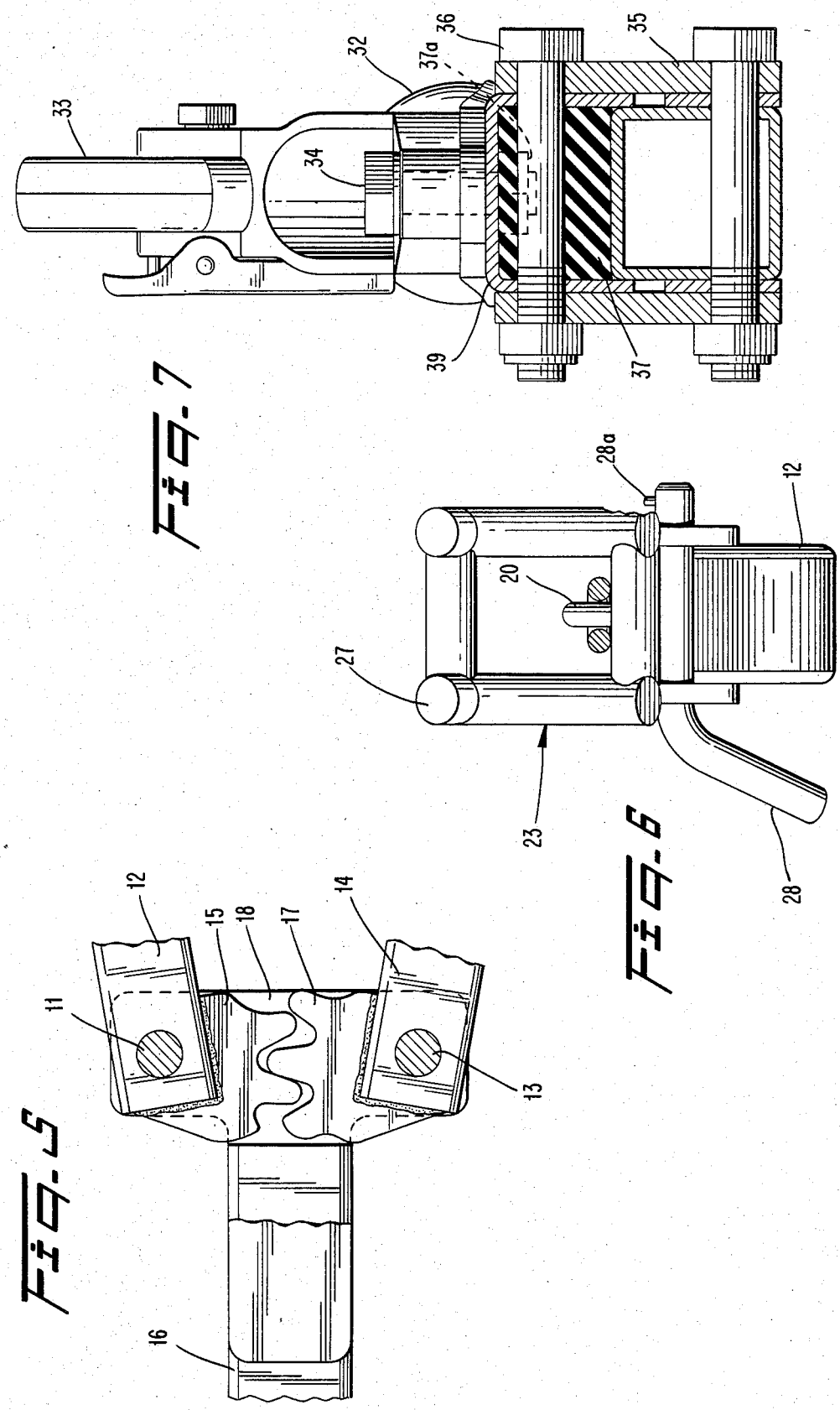

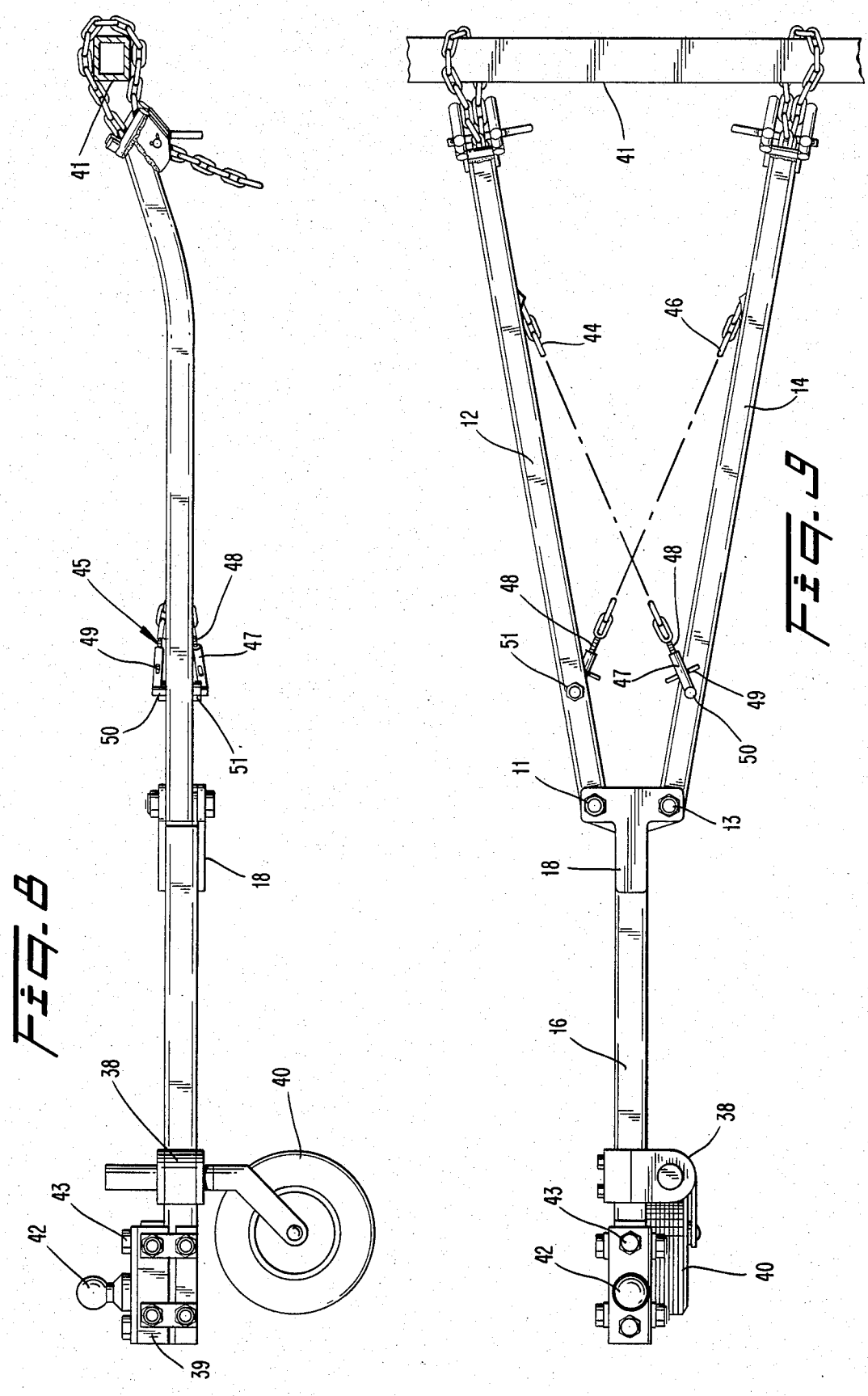

HITCH ASSEMBLY

FIELD OF THE INVENTION

The invention relates to hitch assemblies for towing one vehicle with another. More specifically, the hitch assembly of this invention may be disposed at the rear of a vehicle that is doing the towing or used as a tow bar mounted at the front axle frame structure of the vehicle being towed.

BACKGROUND OF THE INVENTION

There are numerous types of hitch assemblies such as those set forth in the following U.S. Pat. Nos.

| 1,572,914 | 3,000,652 | 3,200,972 |
|---|---|---|
| 2,289,730 | 3,072,419 | 3,583,728 |
| 2,522,793 | 3,083,040 | 3,834,737 |
| 2,782,944 | 3,129,019 | 3,897,085 |

The two U.S. patents most relevant to the subject matter of the invention disclosed herein are U.S. Pat. Nos. 2,782,944 and 3,129,019. Each of these patents disclose hitch assemblies associated with the axle frame structures of the particular vehicles. Both of them show the use of chains as the connecting links for the hitch assembly to the respective vehicles as shown.

The towing device shown in U.S. Pat. No. 2,782,944 includes a frame structure that is attachable to the bumper of the vehicle. This particular device must be used in conjunction with a wrecking truck in which the boom of the truck is used to pull on the chain of the towing device. The hitch assembly as used in this instance includes the lifting of the vehicle being towed.

The hitch assembly as shown in the U.S. Pat. No. 3,129,019 discloses the use of an A-shaped frame having forwardly extending legs which abut the axle frame structure of the vehicle being towed. A chain link is used in conjunction with the frame structure to effect the connecting of the hitch assembly to the vehicle.

A further review of these prior U.S. patent disclosures shows that the vehicle contacting or engaging portion of each of the assemblies is specifically designed to connect to a particular part on the vehicle being towed or doing the towing. This includes the use of permanently disposed parts that are located on the vehicle with the frame structure being detachably mounted thereto. Where parts are present interconnecting the legs of a particular hitch assembly, there is no interrelationship existing between the part of the item that is in contact with the vehicle frame structure or bumper and the stabilization of the elongated projecting legs of the frame structure with respect to the vehicle itself.

PURPOSE OF THE INVENTION

The primary object of the invention is to provide a hitch assembly which may be quickly and conveniently attached to either the front or the rear axle frame structures of a vehicle depending upon whether that vehicle is being towed or is being used to tow another vehicle.

A further object of the invention is to provide a hitch assembly in which a flexible line means is wrapped around the frame structure at one end thereof and is pulled at another end thereof to simultaneously tighten the line wrapped around the axle frame structure while stabilizing the interrelationship of two arms that are movable with respect to each other.

A further object of this invention is to provide a hitch assembly having a means for attachment to an axle frame structure at one end thereof which is quick and efficient and at the other end thereof, provides a shock absorbing device which is usable in conjunction with either a ball or socket depending on whether the device is used on the vehicle performing the towing or on a vehicle being towed.

SUMMARY OF THE INVENTION

The hitch assembly as disclosed and claimed herein includes a boom portion having means for coupling to another hitch mechanism with two leg members mounted to the boom portion and being movable with respect to each other. Each leg member has a contact end for abutting an axle frame structure of a vehicle. A flexible line means extends outwardly from each of the contact ends of the leg members to wrap around the axle frame structure against which each contact end abuts. Means are mounted directly on the assembly for pulling the line means at a location laterally displaced rearwardly from the contact ends to simultaneously tighten the line means wrapped around the respective axle structure while urging the two leg members inwardly with respect to each other. This configuration thus stabilizes the two leg members with respect to each other while at the same time securing the assembly to the axle frame structure of the vehicle.

In a specific embodiment of the hitch assembly of this invention, the coupling means mounted on the boom structure is a socket design for fitting onto the ball of a ball and socket type hitch. Thus, the hitch assembly is useful as a tow bar for attachment to the axle frame structure underneath the vehicle. The flexible line means is a chain having a free end section which extends outwardly from each free contact end of the respective leg member. Each leg member includes a means for fastening the free end section of the chain after it has been wrapped around the frame structure against which the respective contact end abuts.

A particular feature of the invention is the angular disposition of a frame structure engaging surface found at each contact end of the leg members. The engaging surface is in contact with the axle frame structure when the assembly is positioned on the vehicle. The structural configuration of the contact end of each leg member is specifically designed to fit any solid frame structure found under the vehicle. It is specifically desired to avoid the necessity to contact the bumper of the particular vehicle being towed or doing the towing.

To effect this universal application of the hitch assembly to the axle structure of the vehicle, a projection means may be located at the top edge of the frame structure engaging surface to facilitate the positioning of the contact end of each leg member against the axle frame structure. Means are also provided to control the distance that is maintained between the leg members so that their connection to the axle frame structure of the vehicle is symmetrical with respect to the center of the vehicle. In the embodiment having the leg members each pivotally mounted to the boom portion, a gear mechanism is specifically attached to the end of each of the leg members to maintain the desired spacing between the leg members when attaching the contact ends thereto. It is also within the contemplation of the invention to have only one pivotal leg member which may be adjusted through the tightening of the line extending out of the contact ends and being pulled toward the opposed leg members either through a turnbuckle mechanism or a ratchet mechanism as discussed hereinbelow.

A further feature of the invention is directed to the construction of each leg member having a means for guiding the line means rearwardly from the contact end to a location laterally displaced rearwardly from the contact end. The guiding means includes a hollow portion extending along a length of each leg member to form a bore section through which the line means extends rearwardly from the contact end. Thus where the line means is a chain section, the free end section of the chain projects outwardly from the contact end and extends rearwardly to a location for pulling on each respective chain section so that there is a urging of the leg members together. In a first embodiment, the pulling means includes a means for attaching the chain at a location laterally displaced rearwardly from the forward contact end of each leg member. The attaching means includes a means for fixing an inner end of the chain extending along each leg member at a location laterally displaced from the forward contact end and a means for urging the line means in a direction extending along its longitudinal axis thereof and toward the opposing leg member.

The urging means may include a tightening member for pulling on the line means or chain in a rearward direction and away from the leg members to a single location disposed between the two leg members. The tightening member is mounted on the boom portion and includes a retrieving means for pulling on the chain rearwardly toward the boom portion. In this instance, the tightening member is a ratchet device and the retrieving means includes a strap connected at one end to the ratchet device and at the other end to a ring member for embracing the chain at the location between the two leg members.

In another embodiment, the urging means may include a turnbuckle mechanism fastened to each of the opposing leg members and connected to a chain length extending outwardly from the contact end of the other opposing leg member. Thus, the turnbuckle mechanism is effective to pull on the chain along its longitudinal axis to thereby tighten the chain around the frame structure against which the contact end abuts while at the same time causing the leg member to be urged toward the leg member on which the turnbuckle mechanism is fastened.

The particular feature of the invention as disclosed includes two chain sections each having one end fixed to a leg member. The pulling means includes means for grasping both chain sections at the laterally displaced location between the leg members and means for retrieving a grasping means in a direction toward the boom section. One end of each chain section is fixed to the same leg from which it extends outwardly at the contact end thereof. The grasping means includes an openable ring member which embraces both chain sections at a location between the leg members.

Where both leg members are pivotally mounted to an end section of the boom portion, they are effective to be folded between an extended position whereby the contact ends thereof are directed away from the boom portion and a folded position in which the leg members are parallel to and adjacent the boom portion.

A further feature of the hitch assembly includes the use of shock absorbing means mounted at the end of the boom portion for use with the coupling means. The boom portion includes an elongated boom member having a top surface. Shock absorbing means includes a U-shaped channel section, a linkage mechanism and a resilient block means. The channel section opens toward and is spaced upwardly from the top surface of the boom member. The resilient block means is disposed between the channel section and the top surface of the boom member. The linkage mechanism pivotally connects the channel section to the boom member to allow the channel section to move in a direction parallel to the longitudinal axis of the boom member against the resiliency of the resilient block means.

Where the hitch assembly is to be used in conjunction with the ball portion of a socket and ball type hitch, means are provided for maintaining the end of the boom member at a spaced distance from the ground when the assembly is attached to the axle frame structure of the vehicle. This spaced distance maintaining means may include a caster type wheel mounted on the boom member or a hanger mechanism whereby the boom member may be suspended from the frame structure of the vehicle to which the hitch assembly is attached.

BRIEF DESCRIPTION OF DRAWINGS

Other objects of this invention will appear in the following description and claims, reference being made to the accompanying drawings forming a part of the specification wherein like reference characters designate corresponding parts in the several views.

FIG. 3 is a side elevational view of the assembly of FIG. 1;

FIG. 4 is a top plan view of the assembly of FIG. 1 shown in a folded position;

FIG. 5 is a detailed fragmentary view of the encircled portion designated V in FIG. 2;

FIG. 6 is a fragmentary end view of a leg member of an assembly made in accordance with this invention;

FIG. 7 is an end view of the coupling portion of the assembly as shown in FIG. 1;

FIG. 8 is a side elevational view of a hitch assembly used for attachment to a rear axle frame structure of a vehicle; and FIG. 9 is a top plan view of the hitch assembly of FIG. 8.

DETAILED DESCRIPTION

Figure 1:
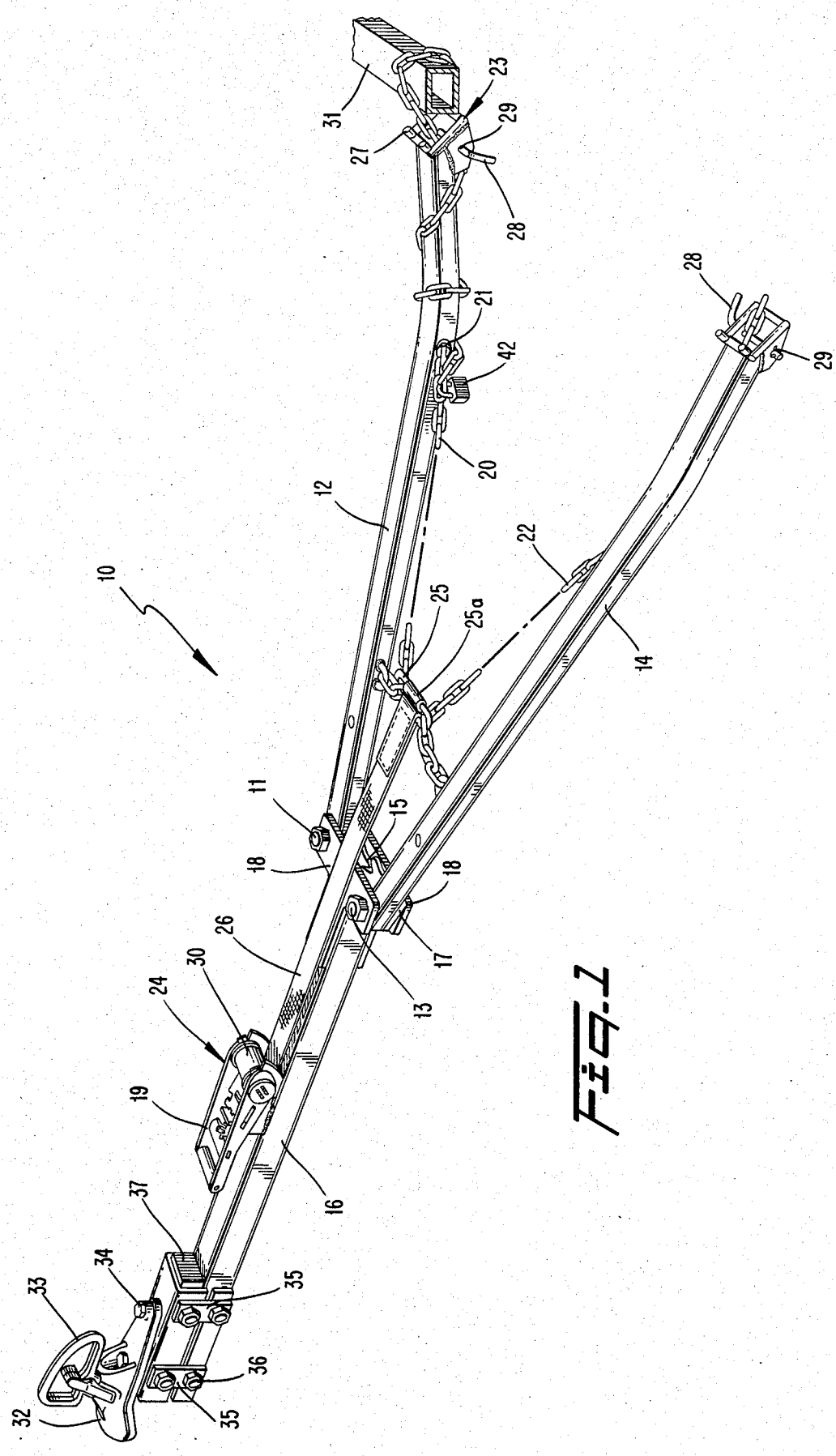
FIG. 1 is a perspective view of a tow bar embodiment of the hitch assembly made in accordance with this invention.

The tow bar hitch assembly, generally designated 10, comprises a pair of leg members 12 and 14 pivotally attached to a boom portion. The boom portion includes a boom member 16 welded to T-shaped boom end brackets 18 through which pivot pins 11 and 13 project. Leg members 12 and 14 are pivoted at one end to the respective pivot pins 11 and 13.

Figure 2:
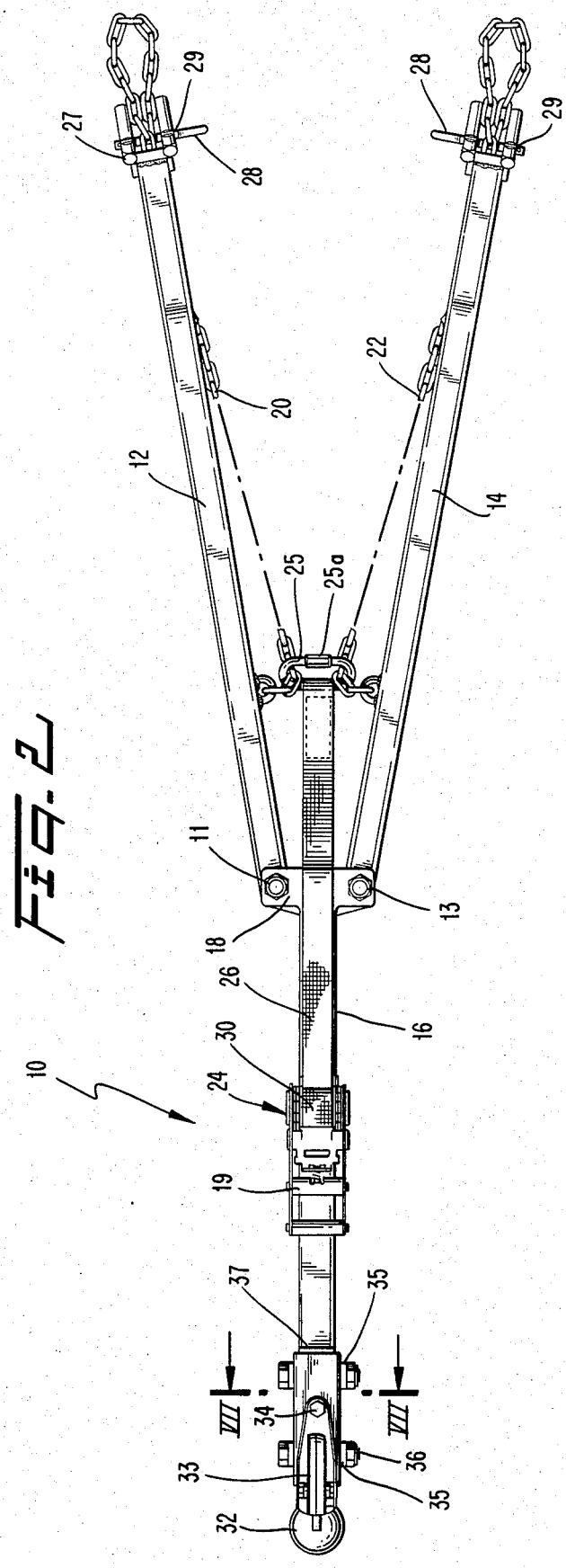
FIG. 2 is a top plan view of the assembly as shown in FIG. 1.

The tow bar assembly 10 is shown in an extended operating position in FIGS. 1 and 2 and in a folded, storage position in FIG. 4. The gear members 15 and 17 are welded to the respective leg members 12 and 14. When the assembly 10 is in the extended position, the gear members 15 and 17 mesh as shown in FIG. 5 so that proper constant and controlled positioning of leg members 12 and 14 is maintained with respect to each other.

Chain lengths 20 and 22 are attached at one end to the inside of the leg members 12 and 14, respectively. In this embodiment, leg members 12 and 14 are rectangular tube members having openings 21 on the inside wall of each member.

Each leg member 12 and 14 includes a contact end 23 designed to abut against the axle frame structure underneath the vehicle. The chain lengths 20 and 22 protrude through the openings 21 and out from each of the contact ends 23 of the leg members 12 and 14. This provides a free end section of the chain lengths 20 and 22 which is wrapped around the axle frame structure against which each contact end 23 abuts.

Once the free end section of each chain length 20 and 22 is wrapped around the particular axle frame structure 31 of the vehicle, it is placed back into the end of the respective leg member 12 and 14 and pulled tightly against the axle frame structure. Once it is in place, each leg member 12 and 14 has a means for fastening that free end section of the respective chains 20 and 22.

The chain fastening means includes a fastening pin 28 having a handle shaped at one end and a detent 28a at the other end. Detents 28a fit through a pair of openings 29 located on opposing side walls of the respective leg members 12 and 14 as shown. This particular embodiment is designed so that pin 28 passes through openings 29 and rests between the lengths of chain attached to a common intermediate link that is disposed between pin 28 inserted through openings 29 and the inside surface of each leg member 12 and 14.

Any length of chain end section remaining, after contact end 23 is snugly placed against the axle frame structure, is then simply wrapped rearwardly around the outside of the respective leg member 12 and 14. A standard lock device 42 connects the end section to the chain protruding from the opening 21. This is shown only in FIG. 1 for clarity.

An openable ring member 25 has a threaded collar 25a that enables the ring to be opened and closed. When in an open position, ring member 25 is placed to embrace both chain lengths 20 and 22. This is accomplished once assembly 10 is unfolded from the storage position as shown in FIG. 4 into the extended position as shown in FIG. 1.

A strap 26 extends from ring member 25 to drum 30 of a ratchet device 24. The ratchet device 24 is a standard strap tightening device as found in cargo hold-down assemblies. The ratchet device 24 includes a handle 19 that pivots to cause strap 26 to be wound around drum 30 using the well known ratchet mechanism commercially known as "Aeroquip".

Once the free end sections of chain lengths 20 and 22 are placed around the axle frame structure 31, strap 26 is tightened and secured by the lock mechanism 42. Thus, chain lengths 20 and 22 are pulled in a rearward direction and away from leg members 12 and 14 and to a single location disposed therebetween.

Ratchet device 24 constitutes a tightening member mounted on boom 16 while the rotatable drum 30 constitutes a retrieving means for pulling strap 26 and, thus, chain lengths 20 and 22 from the single location between leg members 12 and 14 rearwardly toward boom member 16.

The unique aspect of this particular assembly 10 is that when ring member 25 embraces chain lengths 20 and 22, the respective chain loops around the axle frame structure are tightened. Simultaneously therewith, leg members 12 and 14 are urged inwardly with respect to each other. Abutment members 27 located at the contact ends 23 are pulled tightly to the respective axle frame structure. With this particular structural configuration of the assembly, the hitch assembly of the invention can be adapted to any axle frame structure of any vehicle. Thus, it is a universal type hitch assembly.

A coupling mechanism is disposed on the top surface and at the outer end of elongated boom member 16. In the embodiment of FIG. 1, the coupling means constitutes the female portion 32 of a ball and socket type hitch assembly. A handle 33 is disposed at the top of the socket portion 32. Bolts 34 fix the socket portion 32 to the web of a U-shaped channel member 39. Portion 32 is part of a commercially available device.

The U-shaped channel member 39 opens toward and is spaced upwardly from the top surface of boom member 16. A resilient block 37 is disposed between channel section 39 and the top surface of boom member 16 as shown. Bores are provided through the resilient block 37 for bolts 36 extending across channel section 39 for holding the links 35 in place. Recesses 37a are located on the top surface of block 37 for the ends of bolts 34 extending through the web of channel section 39.

Links 35 are pivotally mounted to channel section 39 and boom member 16 so as to pivot around the bolts 36 as shown. Thus, U-shaped channel section 39, linkage mechanism 35, 36 and resilient block 37 constitutes a shock absorbing means. Linkage mechanism 35, 36 pivotally connects channel section 39 to boom member 16 to allow channel section 39 to move in a direction parallel to the longitudinal axis of boom member 16 against the resiliency of resilient block 37.

The resilient block 37 is made of a rubber material having a consistency about the same as a standard automobile tire material.

With the shock absorbing mechanism of this device, the shock of sudden stops and starts is minimized. Furthermore, boom member 16 is disposed slightly lower once the socket 32 is disposed on the ball hitch of a towing vehicle. The difference in height aids in the placement of the entire assembly 10 extending from underneath the towed vehicle. One of the benefits of this assembly 10 over the prior art assemblies is that there is no possibility of any damage being made to the bumper or body portion of the vehicle to which it is attached.

Assembly 10 may be used as a ball hitch mechanism disposed on the rear axle structure of a towing vehicle. The embodiment of FIG. 8 shows a wheel mechanism 40 placed on boom 16 with a bracket 38. A ball hitch member 42 is fixed to the web of the U-shaped channel 39 via bolts 43. In this embodiment, the free end sections of chain lengths 20 and 22 are wrapped around the rear axle frame structure 41 as shown. It is possible that boom member 16 may be suspended from the frame members of the vehicle underneath the bumper rather than using the wheel assembly 40. Assembly 40 or its equivalent is commercially available.

Each contact end 23 includes an angularly disposed frame structure engaging surface which is in contact with the axle frame structure when assembly 10 is positioned on the vehicle. Projections 27 located at the top edge of the engaging surface facilitate the positioning of contact end 23 against either the rear axle or front axle frame structure of the vehicle.

Each leg member 12 and 14 includes means for guiding the line means rearwardly from the respective contact end 23 to a location laterally displaced rearwardly therefrom. In this embodiment, the guiding means includes a hollow portion extending along a length of each leg member 12 to form a bore section through which chain lengths 20 and 22 extend rearwardly from contact ends 23.

Pulling means include a means for attaching the chain lengths 20 and 23 at a location laterally displaced rearwardly from the forward contact ends 23 of each leg member 12 and 14. The attaching means includes a means for fixing an inner end of chain lengths 20 and 22 extending along each leg member 12 and 14 at a location laterally displaced from the forward contact end and a means for urging the line means or chain lengths 20 and 22 in a direction extending along its longitudinal axis thereof and toward the opposing leg member. Thus, chain 20 is pulled toward leg member 14 and chain 22 is pulled toward leg member 12.

In the embodiment shown in FIGS. 8 and 9, urging means includes a turnbuckle mechanism 45 fastened to each of the opposing leg members. Turnbuckle mechanisms 45 are effective to pull on the chain lengths 44 and 46 along the longitudinally extending direction from the opposing leg member. The end of each chain length 44 and 46 is fixed to a threaded bolt 48 which in turn is threadingly engaged to an inner diameter threaded member 47 and rotated via the handle 49.

Handle 49 slidingly engages openings on opposing sides of the rotatable threaded member 47. Thus, handle 49 may be extended to a full length to either side of rotatable members 47 to compensate for space limitations while rotating members 47.

Threaded bolt 48 in this embodiment is formed by fixing the end link of each chain length 44 and 46 to a threaded rod. Thus, the threaded rod portion of bolt 48 moves into and out of member 47 depending upon whether member 49 is rotated clockwise or counterclockwise. The end link of each chain 44 and 46 is welded to the threaded rod to form bolt 48.

As bolt 48 is tightened by rotation of members 47 using handles 49, the respective free end sections of chains 44 and 46 are tightened around the axle frame structure 41 as shown. Simultaneously, leg members 12 and 14 are urged inwardly with respect to each other.

Each turnbuckle mechanism 45 includes an anchor member 50 which projects through openings in the top and bottom surfaces of leg members 12 and 14. The anchor members 50 include a threaded portion onto which nuts 51 thread for tightening anchor members 50 in place. Rotatable members 47 are mounted to freely rotate upon anchor members 50 in any well known fashion. Members 47 each have a hollow bore (not shown) for receiving the in and out movement of bolts 48 as members 47 are rotated as described above.

The embodiments shown connected to axle structures 31 and 41 in respective FIGS. 1 and 8 are illustrative of how the free end sections are looped around. However, the chains have not been fully tightened by the respective ratchet mechanism 24 or turnbuckle mechanisms 45. That is, the abutment members 27 and axle frame engaging surfaces will be in contact with the axle structures 31 and 41 once the chains are fully tightened.

While the hitch assembly has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. A hitch assembly for a vehicle having front and rear axle frame structures, said assembly comprising:
   (a) a boom portion including means for coupling to another hitch mechanism;
   (b) two leg members mounted to the boom portion and being movable with respect to each other;
   (c) each leg member including a contact end for abutting an axle frame structure of a vehicle;
   (d) flexible line means extending outwardly from each of the contact ends of the leg members to wrap at a location around the axle frame structure against which each contact end abuts; and
   (e) means mounted on the assembly for pulling the line means at a location laterally displaced rearwardly from the contact ends to cause tightening of the line means wrapped around each location on the respective axle structure while at the same time urging the two leg members inwardly with respect to each other.

2. A hitch assembly as defined in claim 1 wherein the line means includes a free end section extending outwardly from each free contact end, and each leg member includes a means for fastening the free end section of which has been wrapped around the axle frame structure against which the respective contact end abuts.

3. A hitch assembly as defined in claim 1 wherein each contact end includes an angularly disposed frame structure engaging surface which is in contact with the axle frame structure when the assembly is positioned on the vehicle.

4. A hitch assembly as defined in claim 1 wherein the contact end of each leg member includes a frame structure engaging surface and a projection means located at the top edge of the engaging surface to facilitate the positioning of the contact end against the axle frame structure.

5. A hitch assembly as defined in claim 1 wherein each leg member includes a means for guiding the line means rearwardly from the contact end to a location laterally displaced rearwardly from the contact end.

6. A hitch assembly as defined in claim 5 wherein said guiding means includes a hollow portion extending along a length of each leg member to form a bore section through which the line means extends rearwardly from the contact end.

7. A hitch assembly as defined in claim 1 wherein the pulling means includes a means for attaching the line means at a location laterally displaced rearwardly from the forward contact end of each leg member.

8. A hitch assembly as defined in claim 7 wherein said attaching means includes a means for fixing an inner end of a line means extending along each leg member at a location laterally displaced from the forward contact end and a means for urging the line means in a direction extending along its longitudinal axis thereof and toward the opposing leg member.

9. A hitch assembly as defined in claim 8 wherein the urging means includes a turnbuckle mechanism fastened to each of the opposing leg members and effective to pull on the line means along said longitudinally extending direction from the opposing leg member.

10. A hitch assembly as defined in claim 8 wherein said urging means includes a tightening member for pulling on the line means in a rearward direction and away from each of the leg members to a single location disposed between the two leg members.

11. A hitch assembly as defined in claim 10 wherein the tightening member is mounted on the boom portion and includes a retrieving means for pulling on the line means from said location rearwardly toward the boom portion.

12. A hitch assembly as defined in claim 11 wherein the tightening member is a ratchet device and the retrieving means includes a strap connected at one end to the ratchet device and at the other end to a ring member for attachment to the line means.

13. A hitch assembly as defined in claim 1 wherein the flexible line means comprises a chain having a free end section extending outwardly from each contact end of the leg member, and
each leg member includes a means for fastening the free end section of the chain which has been wrapped around the axle frame against which the respective contact end abuts.

14. A hitch assembly as defined in claim 13 wherein there are two chain sections each having one end fixed to a leg member, and
the pulling means includes means for grasping both chain sections at said laterally displaced location and means for retrieving the grasping means in a direction toward the boom portion.

15. A hitch assembly as defined in claim 14 wherein said one end of each chain section is fixed to the same leg member from which it extends outwardly at the contact end thereof, and
the grasping means includes an openable ring member for embracing both chain sections at a location between the leg members.

16. A hitch assembly as defined in claim 1 wherein both leg members are pivotally mounted to an end section of the boom portion with means for maintaining a controlled distance between the two leg members.

17. A hitch assembly as defined in claim 1 wherein both leg members are pivotally mounted to an end section of the boom portion and are effective to be folded between an extended position whereby the contact ends thereof are directed away from the boom portion and a folded position in which the leg members are parallel to and adjacent the boom portion.

18. A hitch assembly as defined in claim 1 wherein the coupling means includes shock absorbing means mounted at the end of the boom portion.

19. A hitch assembly as defined in claim 18 wherein the boom portion includes an elongated boom member having a top surface, and
the shock absorbing means includes a U-shaped channel section, a linkage mechanism, and a resilient block means,
the channel section opens toward and is spaced upwardly from the top surface of the boom member,
the resilient block means is disposed between the channel section and the top surface of the boom member, and
the linkage mechanism pivotally connects the channel section to the boom member to allow the channel section to move in a direction parallel to the longitudinal axis of the boom member against the resiliency of the resilient block means.

20. A hitch assembly as defined in claim 1 wherein the boom portion includes a boom member and means for maintaining the end of the boom member at a spaced distance from the ground when the assembly is attached to the axle frame structure of a vehicle.

* * * * *